United States Patent [19]

Masler, III

[11] 4,404,309
[45] Sep. 13, 1983

[54] PROCESS OF PREPARING COPOLYMER OF LOWER CARBOXYLIC ACID AND ESTER THEREOF

[75] Inventor: William F. Masler, III, Hinckley, Ohio

[73] Assignee: The B. F. Goodrich Company, Akron, Ohio

[21] Appl. No.: 288,225

[22] Filed: Jul. 29, 1981

[51] Int. Cl.$^3$ .......................... C08F 20/06; C08K 5/05
[52] U.S. Cl. .................................. 524/379; 524/389; 526/75; 526/317; 528/271
[58] Field of Search ................ 260/29.6 RW, 29.6 H, 260/29.6 E, 29.6 ME, 29.6 CM, 29.6 AT, 33.4 R; 528/271; 524/379, 389; 526/317, 75

[56] References Cited

U.S. PATENT DOCUMENTS

| | | | |
|---|---|---|---|
| 3,005,785 | 10/1961 | Jones et al. | 528/271 |
| 3,151,869 | 10/1964 | Butcher | 277/209 |
| 3,531,133 | 9/1970 | Shusley | 277/209 X |
| 4,052,502 | 10/1977 | Clark | 264/322 X |
| 4,210,702 | 7/1980 | Dalibor | 526/317 |
| 4,301,266 | 11/1981 | Muenster et al. | 526/317 |

Primary Examiner—Harry Wong, Jr.
Attorney, Agent, or Firm—Alfred D. Lobo; Nestor W. Shust; Alan A. Csontos

[57] ABSTRACT

A "one pot" process is taught for the preparation of a water-soluble interpolymer starting with acrylic acid or methacrylic acid or mixtures thereof, and a lower aliphatic alcohol. The process comprises concurrently converting the lower carboxylic acid to an ester, and polymerizing reactants and reaction products under reflux conditions in the copresence of a strongly acid esterification catalyst and a free radical initiator for the polymerization; and, recovering the copolymer. In the reaction mixture there is simultaneous formation (i) of water, the removal of which determines the amount of ester formed, and (ii) of polymer. The initiator survives the strongly acid esterification catalyst, and polymerization is not adversely affected by the formation of water and the presence of the esterification catalyst, despite elevated temperature conditions.

10 Claims, No Drawings

PROCESS OF PREPARING COPOLYMER OF LOWER CARBOXYLIC ACID AND ESTER THEREOF

BACKGROUND OF THE INVENTION

This invention relates to the formation of water-soluble copolymers (the term "copolymer" is used herein to denote an interpolymer of two or more monomers) of alpha-beta olefinically unsaturated carboxyl monomers, and more particularly to a process, carried out in a single vessel (hence referred to as a "one pot" or "single pot" process), starting only with a lower carboxylic acid. As uncrosslinked or uncured water-based coatings, they dry to a water-resistant film but are easily removed with alkaline soap and water, or aqueous alkali. Water-based coatings are used as a primary film former for uses where alkali solubility is desired. In alkaline water and several solvents, resins formed by the one-pot process of this invention yield films which by choice of monomers and their proportions, may be clear, water-resistant, glossy, non-tacky, and adhere well. Moreover, these resins lend themselves to be tailored for applications in paper coatings, enteric coatings, pressure sensitive adhesives, cosmetic preparations, baking enamels, textile print pastes, non-woven fabrics, leather and allied fields. Some of the most promising uses appear to be those in which the resin functions as a binder.

Water-soluble thermosetting copolymers of a lower carboxylic acid, a N-methylol acrylamide (or methacrylamide), and certain lower alkyl acrylates (or methacrylates), and a method for making them are disclosed in U.S. Pat. No. 3,007,887 to Henry J. Essig. Each of the monomers and a lower aliphatic alcohol solvent is charged, along with a peroxide initiator, into a glass lined reaction vessel and the polymerization is carried out at reflux temperature.

From a production point of view, it is undesirable to prepare each of the monomers separately. It is more economical to carry out the reaction starting only with the most easily available raw materials, concurrently use solvent, catalyst and initiator, along with inhibitors and accelerators if they are deemed necessary, and to run the polymerization in a one pot process. Except for the competing reactions which might interfere with formation of the desired polymer, this would appear to be quite feasible. It is not. To begin with, the presence of an N-methylol acrylic amide monomer in a one pot process, mixed with acrylic or methacrylic acid, an acrylate and a methacrylate, does not result in the polymer disclosed in the patent. Interfering side reactions dictate that the amide monomer be excluded from the reactants for a one pot process.

As is well known, acrylic acid and methacrylic acid for commercial purposes typically contain a significant amount of inhibitor. It is necessary to use sufficient initiator to overcome the effect of the inhibitor for polymerization to occur, and in the presence of the acid esterification catalyst, side reactions such as transesterification or, ionic decomposition of the peroxide initiator without formation of free radicals, may occur, the probability of occurrence of which militate against the use of a one pot concurrent esterification and polymerization reaction.

It is also known that the heterolytic decomposition of peroxides would be expected to be promoted by electronically dissimilar substituents on the peroxide group, and by a polar medium, and should be susceptible to acid catalysis (see "O-O Heterolysis: Intramolecular Nucleophilic Rearrangement" in ORGANIC PEROXIDES, by Alwyn G. Davies, Butterworths, London 1961).

Still further, it is particularly significant that, in view of the many ways available to esterify an alpha-beta unsaturated monocarboxylic acid, I known of only one method which economically lends itself to concurrent esterification and polymerization.

A further complication is that esterification of the carboxylic acid monomer results in the formation of water which, though eventually removed by refluxing the reaction mass in my novel process, nevertheless may adversely affect both the progress of the desired polymerization reaction, and the resulting products of polymerization.

Still another complication is that it is known that the presence of water in a polymerization in alcohol, may accelerate the reaction and raise the molecular weight much higher than in an anhydrous system. Particularly since the starting material is acrylic acid or methacrylic acid, it is quite unexpected that the presence of water and the presence of the acid esterification catalyst at reflux temperatures still produces a highly desirable copolymer.

SUMMARY OF THE INVENTION

It has been discovered that polymerization of a lower alpha-beta, olefinically unsaturated monocarboxylic acid and an ester thereof may be carried out at substantially the same time as the conversion of the carboxylic acid to the ester, and in the same reaction vessel. The resulting resins are essentially non-crosslinked and range from soft flexible materials to very hard solids depending upon the choice of monomers, and the molecular weight of the resins. The resins may be cured, that is, cross-linked with appropriate cross-linking agents, and even so, may also provide both soft flexible resins as well as hard resins, again depending upon the choice of monomers and the molecular weight of the resins produced. The resins are useful in a wide array of products, particularly in coating compositions.

Accordingly, it is general object of this invention to provide a one pot process for making thermosetting water-soluble copolymers, starting only with acrylic acid or methacrylic acid, an appropriate lower alkanol solvent which also functions as a reactant in the process, an esterification catalyst, and an initiator for the polymerization reaction. Polymerization is carried out without removing the esterification catalyst. Optionally, one or more additional esters (referred to herein as an "additional ester" to distinguish it from an ester which is readily formed during the esterification reaction), which are not readily formed under the esterification conditions for the monocarboxylic acid raw material, and an accelerator may also be added.

It is a specific object of the process of this invention to start with an alpha-beta, olefinically unsaturated monocarboxylic acid and a lower aliphatic monohydric alcohol as raw materials, and to prepare a copolymer in a one pot process, comprising, esterifying a predetermined amount of said acid in the presence of an esterification catalyst, controlling the removal of water so that a predetermined amount of an ester of said acid is formed in the presence of a polymerization initiator, forming a copolymer of said acid and said ester in an oxygen-free atmosphere, and in the presence of said esterification catalyst, and removing said copolymer.

DETAILED DESCRIPTION OF PREFERRED EMBODIMENTS

The preferred process embodied in this invention utilizes specific alpha-beta, olefinically unsaturated monocarboxylic acids which may be esterified and polymerized substantially concurrently in a one pot reaction. These specific acids are acrylic acid and methacrylic acid.

Esterification of the aforementioned acids is effected by reaction with a lower aliphatic monohydric alcohol having from 1 to about 4 carbon atoms, in the presence of a strongly acid esterification catalyst. Most preferred alcohols are methanol, ethanol, n-propanol, isopropanol, and the butanols, and an excess of alcohol is always present. This excess of lower alcohol functions as a solvent medium in which the esterification is carried out. As will presently be evident, the alcohol also functions as a solvent medium in which the ester formed is polymerized concurrently with formation of various polymers and of additional amounts of ester.

Since there is sufficient initiator present in the alcohol solvent to initiate polymerization, addition of a carboxylic acid such as acrylic acid, gives rise to formation of some polyacrylic acid which is then esterified. Since there is esterification catalyst present, ester is formed, which ester, because of the initiator, is polymerized, and in turn may link with acrylic acid or polyacrylic acid to form a copolymer. Some of the reactions may be set forth as below:

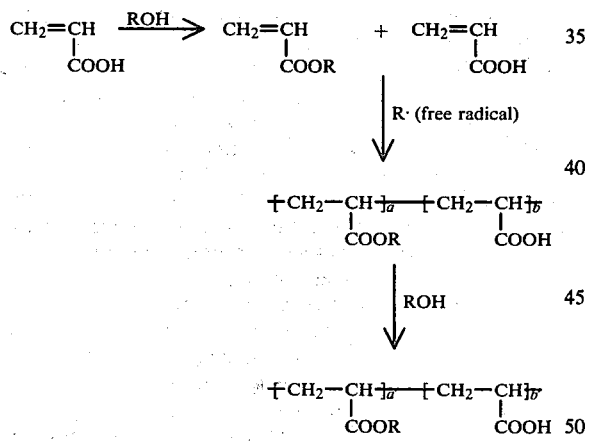

wherein, R represents lower alkyl having from 1 to 4 carbon atoms a,a',b, and b' are integers in the range from 5 to 1000.

Though the ester formed from the carboxylic acid raw material may be the only ester desired in the copolymer, it may also be desirable to introduce additional esters into the copolymer which additional esters would not be easily formed by esterification of the raw material under process conditions. For example, acrylic acid and methylmethacrylate may be concurrently added to hot isopropyl alcohol containing a proton-donating esterification catalyst and a polymerization initiator. The result is a copolymer of acrylic acid, isopropyl acrylate and methylmethacrylate.

The esterification catalyst used is not critical as long as it provides a hydrogen ion in an amount sufficient to effect esterification of the acrylic or methacrylic acid with the formation of water. The temperature of esterification is the reflux temperature of the reaction mass usually under autogenous pressure. The pressure may be subatmospheric or superatmospheric, but it is preferred to carry out the reaction at a pressure in the range from about 0.5 to about 5 atmospheres in an oxygen-free atmosphere. Preferred operation is at atmospheric pressure and a temperature in the range from about 80° C. to about 180° C., depending upon the alcohol and the relative proportions of the reactants. Refluxing of the reaction mass and removal of water, generally as an azeotrope with the alcohol, drives the esterification until a sufficient amount of ester is formed to provide a predetermined ratio of acid to ester monomer units in the copolymer to be formed. When the azeotrope is removed, it is 'broken' by any appropriate method known to the art, and the alcohol which is freed from the water, is returned to the reactor, unless such a large excess of alcohol is used that it need not be returned.

The foregoing esterification reaction may be carried out in the absence of polymerization initiator, in a first step, and when the desired amount of ester is formed, the initiator, optionally with another ester, is then added in a second step. This is referred to as a "one pot, two step" process. In most cases, the acid esterification catalyst is not neutralized, but it may be neutralized if desired. If it is neutralized, the products of neutralization are not removed from the reactor.

The essential manipulative step of the invention which is so surprisingly effective is polymerizing the carboxylic acid and one or more esters thereof in the presence of the esterification catalyst, whether or not it is neutralized. More surprising is that the process of this invention may be carried out in a single step (hence referred to as "one pot, one step") by removing water from the reaction mass whilst both esterification and polymerization reactions are progressing, without interfering reactions deleterious to the formation of the copolymer desired.

Most preferred esterification catalysts are mineral acids such as sulfuric acid, aralkyl sulfonic acids such as toluene sulfonic acid, and acid iron exchange resins such as Nafion fluoroalkylsulfonic acid resin, conventionally used for esterification. The amount of esterification catalyst used is not critical, and particularly where a solid catalyst is used a large excess is not detrimental to the process. However, where a liquid such as concentrated sulfuric acid is used, more sulfuric acid than is necessary to promote esterification is to be avoided as it will adversely affect the concurrent polymerization reaction. For example, with sulfuric acid as catalyst from about 0.01 part to about 5 parts by weight per 100 parts of carboxylic acid monomer are used, and more preferably from about 0.1 to about 2 parts. Where a solid acid esterification catalyst is used which is insoluble in the alcohol medium, the solid may be separated by filtration of the reaction mass after polymerization is completed, washed and reused. This obviates neutralization of the acid catalyst and permits recovery of the alcoholic solution of the polymer, uncontaminated by an acid catalyst or its salt.

Polymerization of the carboxylic acid and ester thereof is effected with an effective amount of a free radical initiator sufficient to overcome the inhibition effects of any inhibitors which may be present in the carboxylic acid raw material, and to effect copolymerization. Typically, from about 0.2 to about 3 parts by weight of initiator per 100 parts of carboxylic acid monomer are used, preferred initiators being acetyl benzoyl peroxide, peracetic acid, hydroxyheptyl peroxide, isopropyl peroxydicarbonate, methyl ethyl ketone peroxide, cyclohexane peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, benzoyl peroxide, caprylyl peroxide, methyl cyclohexyl hydroperoxide, t-butyl permaleic acid, t-butyl perbenzoate, di-t-butyl diperphthalate, azobis-isobutyronitrile, the so-called redox and heavy metal polymerization initiators and the like, and others. The copolymer is usually formed in high conversion, usually in excess of 80% conversion and often as high as 95 to 100%.

The copolymer formed is converted from alcohol solution to water solutions by the addition of water and a neutralizing agent such as ammonia, a hydrazine or a low-boiling primary, secondary or tertiary aliphatic amine, to the alcoholic solution of polymer followed by an azeotropic distillation which removes last traces of the alcohol and the excess neutralizing agent. The final aqueous solution of polymer salt is preferably in the range from about pH 5 to about pH 8, and more preferably in the range of pH 6–7, with a total solids content of from about 2 to about 60 percent by weight and preferably from about 5 to about 50 percent by weight of polymer in water.

The copolymer is insolubilized in water by a heat treatment at a temperature of from about 100° C. to about 180° C. Generally a heat treat cycle of 5 minutes at 160° C. is sufficient to produce an essentially waterinsoluble and non-crosslinked polymer. It is generally preferred, however, to give the water-soluble polymer a heat treat cycle of from 30 minutes to one hour at about 160° C. to ensure complete insolubility in water while retaining its solubility in alkali. The copolymer may be crosslinked with conventional crosslinking agents such as methylolmelamine, epoxy resins and polyfunctional aziridines. Such cure is effected by heating, if necessary, to a temperature below that which is deleterious to the resin formed.

The copolymer formed conforms to the structure:

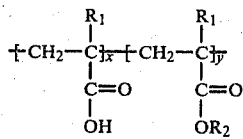

wherein
$R_1$ represents hydrogen and methyl;
$R_2$ represents methyl, ethyl, propyl, and butyl;
x represents from 2 to 50 weight percent (wt %) based on the combined weight of x and y;
y represents from 50 to 98 wt % based on the combined weight of x and y; and,
the sum of the numerical values of $x+y$ is always 100 and the groups x and y are present in a heterogenous relative order.

When both acrylic acid and methacrylic acid monomers are present in amounts $x_1$ and $x_2$ respectively, then $x = x_1 + x_2$.

When more than one acrylate or methacrylate ester is present, whether formed by esterification in the process or added to the reaction mass in amounts $y_1, y_2, y_3, \ldots y_n$, respectively, each amount corresponding to a different ester, then $y = y_1 + y_2 + y_3 + \ldots y_n$.

The copolymers formed may have a weight average molecular weight in the range from about 2000 to about 100,000, and preferably from about 7000 to about 50,000 as determined by gel permeation chromatography. This determination is conventionally made according to ASTM method D-3536-76 (see ASTM Standards, Part 35, 1980), by dissolving the copolymer in tetrahydrofuran and comparing with a solution in THF of polystyrene of known molecular weight. The acid numbers of the copolymers formed, as determined by a conventional titration with KOH, may range from about 15.5 to about 388.5, the preferred polymers having an acid number in the range from about 50 to about 200.

In a typical one pot, one step process, a glass lined reactor is charged with an alcohol in which is dispersed or dissolved the esterification acid catalyst and the polymerization initiator, and the contents are heated to reflux temperature. If a combination of acrylate and methacrylate esters is desired in the copolymer with acrylic acid, then acrylic acid and methacrylate ester are continuously metered, over a period of from about 1 hr to about 24 hrs, concurrently into the reactor, and the temperature is maintained at the reflux temperature at atmospheric pressure to effect an azeotropic distillation. In most instances this procedure of gradual concurrent addition of the monocarboxylic acid, and optionally the additional ester (if the additional ester is to be added), is preferable to adding all the reactants suddenly and at the same time, for heat transfer considerations. It will be recognized that the polymerization reaction is exothermic, and adequate heat removal from the reaction mass must be provided. To drive the esterification reaction towards completion, heat must be added. Balancing the exothermic and endothermic reactions is most readily achieved by gradual addition of the monomer(s). The rate of distillation is adjusted so that a predetermined amount of water is removed as an azeotrope of water and alcohol. The remaining contents of the reactor are then worked up to recover the copolymer.

Alternatively, in a one pot, two step process, only the esterification catalyst may be first added to the alcohol and acrylic acid in the reactor, and the contents heated to the reflux temperature so that a predetermined amount of water may be removed and the desired amount of acrylate ester formed. Thereafter, in a second step, the polymerization initiator is added to the reactor, and optionally, the additional acrylate or methacrylate ester metered into it so as to form the desired copolymer. If the esterification catalyst is not neutralized, as it usually is not, its presence will produce additional ester which is removed as azeotrope. Once the desired amount of ester has been formed by esterification under reflux conditions, further formation of ester may be most easily stopped by neutralizing the esterification catalyst. The copolymer in the reaction mass is worked up as before.

In the following illustrative examples the amounts of ingredients are given in parts by weight unless otherwise specified.

EXAMPLE 1

Preparation of a copolymer of acrylic acidd (AA) and isopropyl acrylate (iPAc) having an acid number of about 100, from AA and isopropyl alcohol (iPA) as raw materials:

The specification of the acid number requires that about 0.18 mol of AA be present per 100 g of polymer, or that 100 g of polymer contain 13 g AA and 87 g (0.76 mol) iPAc. Thus, from 100 g of AA we produce 19.1 g AA and 127.9 g iPAc. From 100 g AA, 20.1 g of water are produced.

Accordingly, 100 g AA is metered into a 2 liter glass reaction flask purged with nitrogen and containing 450 g of pure iPA to which is added 1.0 g of p-toluenesulfonic acid and 4.0 g of Lupersol-11, and the contents of the flask are heated to reflux. Esterification of the acrylic acid, and of polyacrylic acid, and polyacrylate, and polymers of the foregoing, takes place resulting in the formation of an iPA-water azeotrope (the analysis of the actual azeotrope obtained is not precisely 87.8% iPA, 12.2% H$_2$O) about 200 g of which are removed. Analysis of the azeotrope indicates that this amount corresponds to the removal of 20.1 g of water. About 147 g of polymer are formed having an acid number of about 100, and are dissolved in about 250 g. of iPA which remain in the flask. The p-toluene sulfonic acid and polymer are neutralized with excess aqueous NH$_3$ or other base, followed by distillation of the alcoholic polymer solution to remove alcohol as an alcohol-water azeotrope. When enough alcohol solvent is removed to leave a syrupy mass, it is steam distilled and makeup water is added to leave a water solution of the salt of the polymer.

The structure of the polymer is confirmed by IR, GC and NMR analysis. The molecular weight of the polymer is found to be about 5000 as determined by ASTM D-3536-76 gel permeation chromatography.

In a manner analogous with that described hereinabove, a copolymer of AA, iPAc and methylmethacrylate (MMA) having an acid number of about 100 is produced in iPA by adding 70 g AA and 30 g MMA to 450 g of iPA and proceeding as described hereinabove.

EXAMPLE 2

Preparation of a copolymer of acrylic acid (AA) and butylacrylate (BuA) having an acid number of about 170, from AA and BuOH as raw materials:

A 2 liter glass reaction flask is purged with nitrogen and 450 g of pure BuOH are added to it. Also added to it are 1.0 g of p-toluenesulfonic acid, 2.0 g of CBr$_4$ which acts as a molecular weight modifier, and 8.0 g t-butylperbenzoate initiator dissolved in BuOH. The contents of the flask are heated to reflux and the heat adjusted to distill about 17 ml/hr of distillate. 150 g of AA are then added to the reactor continuously at a rate of 36 ml/hr and initiator is added in 16 equal portions over a period of 4 hrs while the contents of the flask are being refluxed. 85 ml of an azeotrope of BuOH and water are removed. Esterification of the acrylic acid, and of polyacrylic acid, and polyacrylate, and polymers of the foregoing, takes place resulting in the formation of esters including BuA, and the BuOH-water azeotrope.

About twice the theoretical amount of ammonia necessary to neutralized the acid present is added, and the neutralized product azeotropically distilled, then steam-stripped to remove alcohol and excess ammonia as in Example 1 hereinabove, to obtain a solution in water of a polymer having an acid number of 173.

The structure of the polymer is confirmed by IR, GC and NMR analysis. The molecular weight of the polymer is found to be about 6000 as determined by ASTM D-3536-76 gel permeation chromatography.

In a manner analogous with that described hereinabove, a copolymer of AA, BuOH and ethylmethacrylate (EMA) having an acid number of about 175 is produced in BuOH by adding 70 g AA and 30 g EMA to 450 g BuOH and proceeding as described hereinabove in this Example 2.

EXAMPLE 3

Preparation of a copolymer of acrylic acid (AA), ethyl acrylate (EA) and methylmethacrylate (MMA) having an acid number of about 150, from AA, MMA and ethyl alcohol (EtOH) as raw materials:

In a manner analogous to that described hereinabove in Examples 1 and 2, about 4 g of Lupersol-11 and 10 g of Nafion 520 in the H$^+$ form, are added to about 500 ml of EtOH in a reaction flask and purged with nitrogen. The temperature is raised to the reflux temperature at atmospheric pressure and 50 g of AA and 50 g of MMA are metered into the flask continuously over a period of about 3 hrs, and azeotropic distillation of the reaction mass is allowed to proceed over a total period of about 6 hrs. after which the desired polymerization is completed. The Nafion remains as a swollen solid and is filtered out, and washed with ethanol. The filtrate is an alcoholic solution of the copolymer AA-MMA-EA in a heterogeneous relative order. This procedure allows the direct formation of an alcoholic solution of the copolymer desired. Neutralization of the filtrate yields polymer which is free of inorganic salts.

I claim:

1. A one-pot process for preparing an alcoholic solution of a copolymer of an unsaturated monocarboxylic acid and an ester thereof, said copolymer having the structure

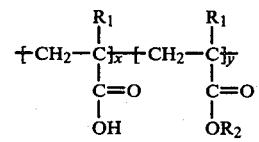

wherein,

R$_1$ represents hydrogen and methyl;

R$_2$ represents methyl, ethyl, propyl, and butyl;

x represents from 2 to 50 weight percent (wt %) based on the combined weight of x and y;

y represents from 50 to 98 wt % based on the combined weight of x and y; and, the sum of the numerical values of x+y is always 100 and the groups x and y are present in an heterogenous relative order, said process comprising, (a) reacting a reaction mixture comprising (meth)acrylic acid, and optionally ester(s) thereof, and a lower aliphatic monohydric alcohol R$_2$OH, wherein R$_2$ has the same meaning as above in the presence of an acid esterification catalyst and a polymerization initiator, at the reflux temperature of said reaction mixture, (b) removing the water formed from the reaction, and (c) recovering an alcoholic solution of said copolymer.

2. The process of claim 1 comprising, after removing said water, neutralizing said esterification catalyst in said reaction mixture, and removing a desired portion of said lower aliphatic alcohol by azeotropic distillation.

3. The process of claim 2 wherein neutralizing said esterification catalyst in said reaction mixture is effected with a neutralizing agent selected from the group consisting of ammonia, hydrazine, a low boiling primary aliphatic amine, a low boiling secondary aliphatic amine, and a low boiling tertiary aliphatic amine.

4. The method of claim 3 wherein said lower aliphatic alcohol is isopropanol and said neutralizing agent is ammonia.

5. The method of claim 3 wherein said lower aliphatic alcohol is 1-butanol and said neutralizing agent is ammonia.

6. A one-pot process for preparing an alcoholic solution of a copolymer of an unsaturated monocarboxylic acid and an ester thereof, said copolymer having the structure

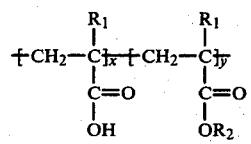

wherein, $R_1$ represents hydrogen and methyl;

$R_2$ represents methyl, ethyl, propyl, and butyl;

x represents from 2 to 50 weight percent (wt %) based on the combined weight of x and y;

y represents from 50 to 98 wt % based on the combined weight of x and y; and, the sum of the numerical values of $x+y$ is always 100 and the groups x and y are present in a heterogenous relative order, said process comprising, (a) esterifying by heating to reflux a mixture comprising (meth)acrylic acid and a lower aliphatic monohydric alcohol $R_2OH$, wherein $R_2$ has the same meaning as above, in the presence of an esterification catalyst to form an ester, (b) removing the water formed from the esterification reaction, thereafter (c) adding polymerization initiator and optionally (meth)acrylate to form a reaction mixture and reacting said reaction mixture at the reflux temperature of said reaction mixture, and (d) recovering an alcoholic solution of said copolymer.

7. The process of claim 6 comprising, after removing said water, neutralizing said esterification catalyst in said reaction mixture with a neutralizing agent selected from the group consisting of ammonia, hydrazine, a low boiling primary aliphatic amine, a low boiling secondary aliphatic amine, and a low boiling tertiary aliphatic amine.

8. A one-pot process for preparing an alcoholic solution of a copolymer of an unsaturated monocarboxylic acid and an ester thereof, said copolymer having the structure

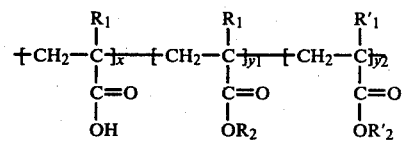

wherein, $R_1$ and $R_1'$ represent hydrogen and methyl;

$R_2$ and $R_2'$ represent methyl, ethyl, propyl, and butyl;

x represents from 2 to 50 weight percent (wt %) based on the combined weight of x, $y_1$ and $y_2$;

$y_1$ and $y_2$ together represent from 50 to 98 wt % based on the combined weight of x, $y_1$ and $y_2$; and, the sum of the numerical values of $x+y_1+y_2$ is always 100 and the groups x, $y_1$ and $y_2$ are present in a heterogenous relative order, said process comprising, (a) reacting a reaction mixture comprising (meth)acrylic acid, a lower aliphatic monohydric alcohol $R_2OH$, wherein $R_2$ has the same meaning as above, and an additional ester $CH_2\!=\!C(R'_1)\text{-}COOR'_2$, wherein $R'_1$ and $R'_2$ have the said meaning as above in the presence of an acid esterification catalyst and a polymerization initiator, at the reflux temperature of said reaction mixture, (b) removing the water formed from the reaction, and (c) recovering an alcoholic solution of said copolymer.

9. The process of claim 8 comprising, after removing said water, neutralizing said esterification catalyst in said reaction mixture with a neutralizing agent selected from the group consisting of ammonia, hydrazine, a low boiling primary aliphatic amine, a low boiling secondary aliphatic amine, and a low boiling tertiary aliphatic amine.

10. The process of claim 9 wherein said lower aliphatic alcohol is ethanol, said (meth)acrylic acid is acrylic acid, said additional ester is methylmethacrylate and said neutralizing agent is ammonia.

* * * * *